F. L. SWANBERG.
VALVE.
APPLICATION FILED MAY 4, 1914.
1,200,668. Patented Oct. 10, 1916.
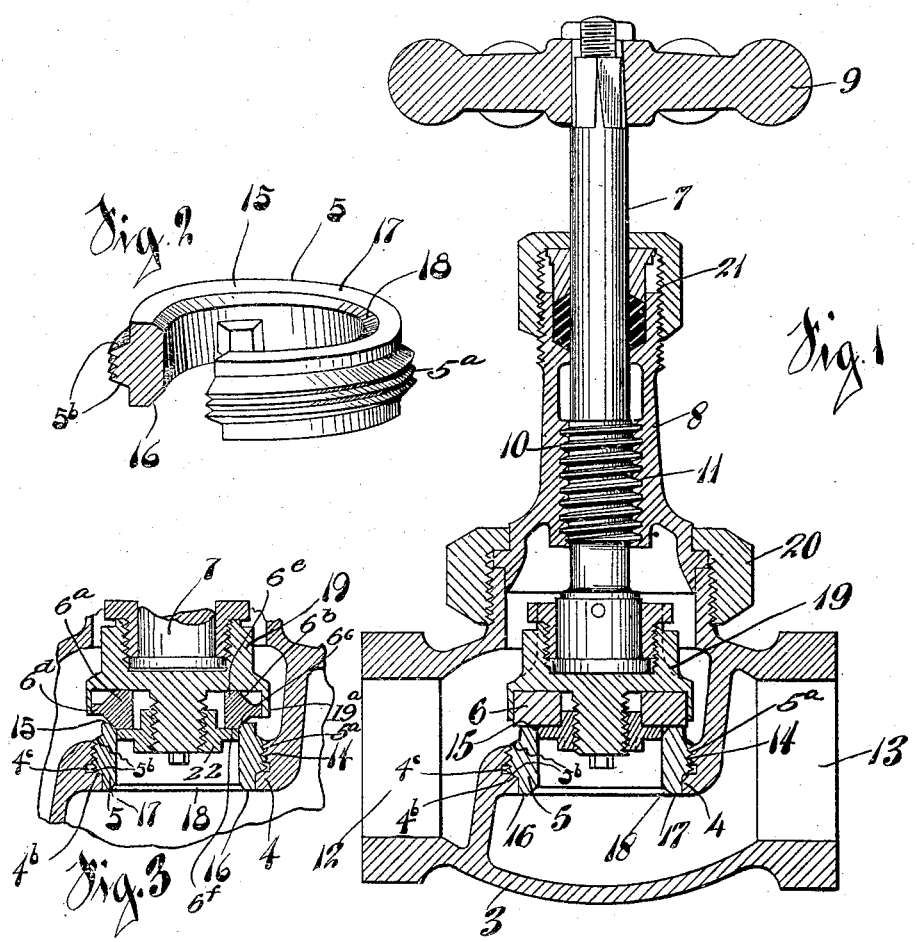

UNITED STATES PATENT OFFICE.

FLOYD L. SWANBERG, OF CINCINNATI, OHIO, ASSIGNOR TO THE D. T. WILLIAMS VALVE COMPANY, OF CINCINNATI, OHIO, A CORPORATION OF OHIO.

VALVE.

1,200,668.  Specification of Letters Patent.  Patented Oct. 10, 1916.

Application filed May 4, 1914.  Serial No. 836,059.

*To all whom it may concern:*

Be it known that I, FLOYD L. SWANBERG, a citizen of the United States of America, and resident of Cincinnati, county of Hamilton, and State of Ohio, have invented certain new and useful Improvements in Valves, of which the following is a specification.

My invention relates to improvements in valves and particularly that class of valves in which the valve seat is removable, renewable and reversible.

An object of my invention is to produce a valve in which the valve seat ring is so formed that it may be secured to the valve casing independently of any securing device which will project into the interior of the valve body and obstruct the passage of fluid therethrough.

A further object is to produce a valve, in which the means for fastening the valve seat in the valve casing are at all times protected from the destructive action of fluid passing through the valve.

A further object is to produce a valve, in which a reversible valve seat is so secured or mounted, that it will not be necessary to disconnect the valve from its connected piping, in order to change the seat.

Another object is to provide a reversible seat ring which is of a form both to fit snugly against the diaphragm and to resist the force of screwing it securely in place.

These and other objects are attained in the valve described in the following specification, and illustrated in the accompanying drawings, in which, Figure 1 is a sectional elevation of a valve embodying my invention. Fig. 2 is a fragmental perspective view of the valve seat embodying my invention, and Fig. 3 is a fragmental sectional view, showing my removable valve seat in use with a slightly modified form of valve disk.

The valve consists of the usual body portion 3, having a ported diaphragm 4, in which a reversible valve seat 5 is screwed, a valve 6 adapted to seat against the valve seat and carried by a stem, which extends upwardly through and is guided by the hub portion 8 of the valve. The usual hand wheel 9 is mounted on the upper end of the stem 7, to actuate the valve, screw-threads 10 and 11 formed on the stem and hub respectively, being provided for that purpose.

The valve casing is formed with the flanged openings 12 and 13, in which the ends of the communicating pipes are secured. The diaphragm 4 is provided with a screw-threaded opening 14, in which the reversible valve seat 5 is secured.

The valve seat consists of a ring 5 having upon its exterior a centrally located annular collar which has symmetrically beveled sides $5^b$, and screw-threads cut into its periphery. At each end of the ring there are formed two seat portions viz; a flat portion 17 for flat surfaced valves and beveled portions 18 for beveled valve disks such as shown in Fig. 3. The diaphragm is so formed that the threaded portion terminates in an annular bevel faced seat $4^b$ on which a beveled portion $5^b$, of the valve seat rests, when the valve is screwed into the diaphragm. An undercut annular recess $4^c$, is also formed in the diaphragm to clear the screw threads $5^a$, of the valve seat thereby permitting the beveled portion $5^b$, of the valve seat, to engage the bevel faced seat $4^b$, formed in the diaphragm to form a fluid tight joint between the valve seat and the diaphragm.

A valve disk holder 19, carrying valve disk 6, see Fig. 1, is rotatably mounted on the end of the valve stem 7. The hub 8 is secured to the body of the valve by means of an internally threaded nut 20, as shown, and a stuffing box 21 is provided at the top of the hub to form a fluid tight joint around the stem.

In Fig. 3 I have shown a reversible valve disk $6^a$ having beveled faces $6^b$ and $6^c$, either of which is adapted to engage the beveled seats 18 formed at the ends of the reversible valve seat. The reversible valve disk is provided with an annular extension $6^d$ adapted to fit within the flanged lower end $19^a$ of the disk holder 19. Flat portions $6^e$ and $6^f$ are formed on the reversible disk for engaging the flat undersurface of the disk holder 19 and the flat shoulder of a disk retaining lock nut 22. By thus providing a reversible disk in addition to the reversible valve seat for the disk I am enabled to prolong the life of the valve materially, since instead of having but two renewable surfaces, the valve is provided with four renewable surfaces which may be employed when the beveled seats are used. This renders the valve as durable when the beveled seats and disks are employed, as when the flat seats and disks such as disks in Fig. 1, are employed.

It will be seen by referring to Fig. 1, that the valve seat may be easily removed through the enlarged opening formed in the top of the valve casing, without having to disconnect the valve at the points 12 and 13, from its connecting pipe.

Another advantage of my invention is the elimination of separate seat-securing means, which extend into the valve passages and obstruct the flow of fluid therethrough. This is accomplished by screwing the reversible valve seat into the diaphragm 4. Furthermore by so securing the valve seat, the securing means, which in this case are the screw threads, are entirely protected from the corrosive action of the fluid passing through the valve. This not only increases the length of life of the securing means, but also permits the valve seat to be easily removed, reversed or replaced.

The bevels $5^b$ upon the collar of the seat ring both strengthen it to resist the pressure exerted in screwing it snugly into the diaphragm, and assist in getting a fluid tight joint with the seat $4^b$ of the diaphragm.

Having thus described my invention, what I claim is:

The combination of a valve housing having a diaphragm in which is a port in the walls of which is formed a screw threaded portion and a beveled projection adjacent to said portion and a valve seat comprising a ring having upon its exterior a collar having beveled side walls and a screw threaded periphery, adapted to engage the screw threaded portion of the port and hold one of said beveled side walls in contact with said beveled projection.

In testimony whereof I have hereunto subscribed my name this 1st day of May, 1914.

FLOYD L. SWANBERG.

Witnesses:
WALTER F. MURRAY,
W. THORNTON BOGERT.

Copies of this patent may be obtained for five cents each, by addressing the "Commissioner of Patents, Washington, D. C."